United States Patent [19]
Nakamichi et al.

[11] Patent Number: 5,123,001
[45] Date of Patent: Jun. 16, 1992

[54] DISK PLAYBACK DEVICE

[75] Inventors: Niro Nakamichi, Kodaira; Makoto Hara, Kunitachi; Yasuhiro Noguchi, Kodaira, all of Japan

[73] Assignee: Nakamichi Corporation, Kodaira, Japan

[21] Appl. No.: 572,050

[22] Filed: Aug. 23, 1990

[51] Int. Cl.[5] .................... G11B 17/22; G11B 17/04; G11B 17/08
[52] U.S. Cl. ........................ 369/36; 369/38; 369/39; 369/191; 360/98.04
[58] Field of Search ............... 369/36, 37, 38, 39, 369/191, 194; 360/97.03, 98.01, 98.04, 99.02, 99.06

[56] References Cited
U.S. PATENT DOCUMENTS

| | | | |
|---|---|---|---|
| 4,653,037 | 3/1987 | Nakayama et al. | 369/194 X |
| 4,691,309 | 9/1987 | Suzuki | 369/38 |
| 4,701,900 | 10/1987 | Hasegawa et al. | 369/36 |
| 4,797,865 | 1/1989 | Imai et al. | 369/36 X |

FOREIGN PATENT DOCUMENTS

| | | | |
|---|---|---|---|
| 0204547 | 8/1988 | Japan | 369/191 |
| 2126004 | 3/1984 | United Kingdom | 369/191 |

Primary Examiner—Stuart S. Levy
Assistant Examiner—Tien Ba Pham
Attorney, Agent, or Firm—Morrison Law Firm

[57] ABSTRACT

A disk playback device with disk changer functions and having a stacker for storing two or more disks for playback allows a new disk to be added or disks to be changed without removing the stacker. The disk playback device is also convenient for playback of single disks not to be stored in the stacker. Transport of the disks is accomplished by displacement of holders in which the disks are individually received. When a disk is in the read position, it is clamped in place and the holder is lowered to a nonobstructing position to allow the disk to be read. The number of holders exceeds the number of stored disks, whereby a vacant holder is available for conveniently reading a disk not stored in the magazine.

9 Claims, 7 Drawing Sheets

DISK PLAYBACK DEVICE

BACKGROUND OF THE INVENTION

The present invention relates to disk playback devices and, more particularly, to a disk playback device having a disk changer with a stacker for storing two or more disks.

A disk playback device with a disk changer that uses a removable stacker for two or more disks is well known. However, in a conventional disk playback device a disk not already loaded into the stacker cannot be played without first removing the stacker to load the disk into it. If the stacker is fully loaded, a disk must be removed to make room for the new disk. This makes the loading and playing of single disks inconvenient.

An attempt to resolve this problem is disclosed in Japanese Utility Model Laid-open Publication No. 62-195257.

The disk playback device described in the above utility model has, in addition to a stacker for two or more disks, a pullout disk tray to allow the playback of a single disk without manipulation of the stacker.

Figures 11, 12:
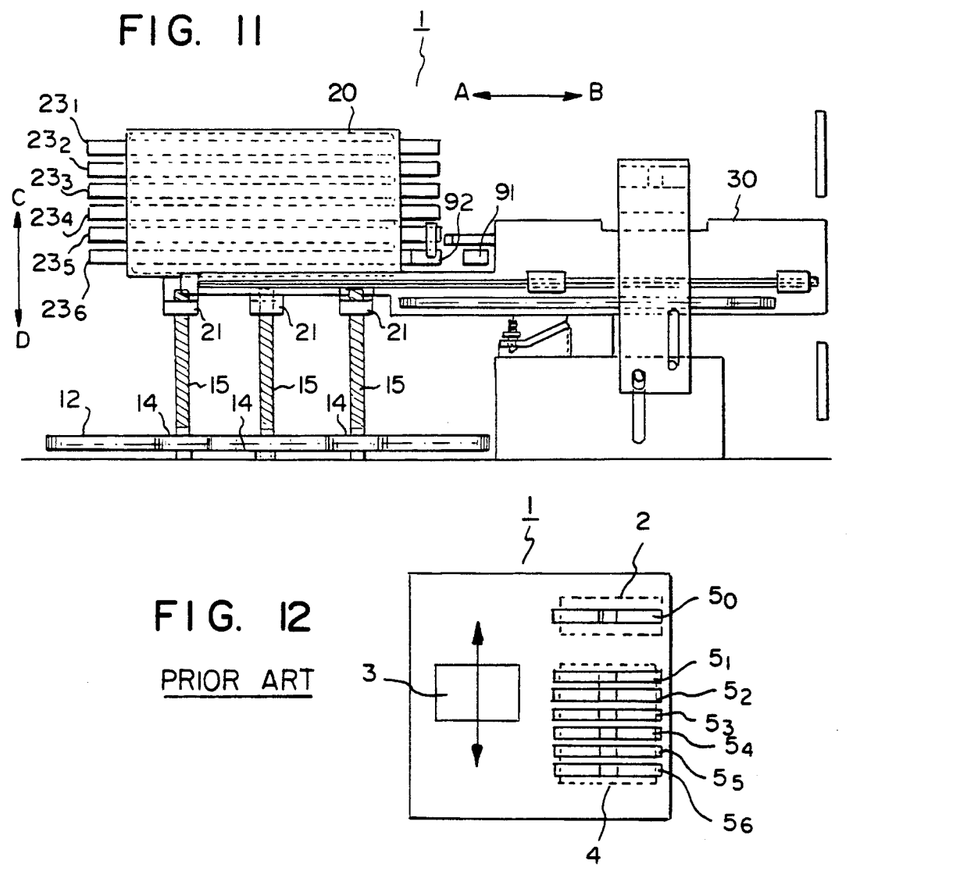
FIG. 11 is a side elevation of the invention with the stacker in the fully up position.
FIG. 12 is a functional representation of the prior art.

As shown in FIG. 12, a disk playback device 1 of the prior art has a stacker 4 for vertically stacking up to six disks, 5.1–5.6. A disk tray 2 is positioned above stacker 4 for loading a single disk 5.0. A disk playback means 3 is included in disk playback device 1 alongside disk tray 2 and stacker 4. Disk playback means 3 is moveable up and down, as indicated by the double-headed arrow, to position it adjacent to a particular one of disks 5.0–5.1 to be read.

In another embodiment of the prior art, it may be possible to move the disk that is selected for playback from disk tray 2 or disk stacker 4 to the level of a fixed position disk playback means 3. A major problem of this approach is that when single disk 5.0 is to be played using disk tray 2, after disk 5.0 is placed on disk tray 2 and pushed into disk player 1, disk 5.0 must be moved over and then lowered to disk playback means 3. This approach requires a very complex disk handling device, especially when compared to a single play disk player.

OBJECTS AND SUMMARY OF THE INVENTION

Accordingly, it is an object of the invention to provide a disk playback device that overcomes the drawbacks of the prior art.

It is a further object of the invention to provide a disk playback device that allows a disk to be played that is not stored in the disk changer without requiring the operator to manipulate the disk changer.

Briefly stated, the present invention provides a disk playback device with disk changer functions and having a stacker for storing two or more disks for playback. The device allows a new disk to be added or disks to be changed without removing the stacker. The disk playback device is also convenient for playback of single disks not to be stored in the stacker. Transport of the disks is accomplished by displacement of holders in which the disks are individually received. When a disk is in the read position, it is clamped in place and the holder is lowered to a nonobstructing position to allow the disk to be read. The number of holders exceeds the number of stored disks, whereby a vacant holder is available for conveniently reading a disk not stored in the magazine.

According to an embodiment of the invention, there is provided a disk storage and playback device comprising: a chassis, a plurality of substantially planar disks, a magazine nondetachably carried by the chassis, the magazine being adapted to receive disks in a concentric array, a disk reader, the disk reader being adapted to read one of the disks when the disk is in a disk-reading position, and first disk conveying means for transporting a selected one of the disks from the magazine to the disk-reading position along a straight line path in the plane of the disk.

According to a feature of the invention, there is provided a disk storage and playback device comprising, a chassis, a magazine nondetachably carried by the chassis and adapted to receive a plurality of disks, first disk conveying means for transporting a disk from the magazine to a position whereat it may be read by the disk reader, and second disk conveying means for transporting a disk not received in the magazine to the position whereat it may be read by the disk reader.

According to a further feature of the invention, there is provided a disk storage and playback device comprising: a plurality of subframes, each of the subframes being adapted to receive a single disk, a magazine nondetachably carried by the chassis, the magazine being adapted to receive the subframes, a disk reader, first conveying means for transporting a selected one of the subframes from the magazine to a position proximate the disk reader, and second conveying means for transporting one of the position proximate the disk reader to a position whereat a disk may be inserted therein.

According to a still further feature of the invention, there is provided a disk storage and playback device comprising: a chassis, a plurality of subframes, each of the subframes being adapted to receive a single one of the disks, a magazine, nondetachably, carried by the chassis, the magazine being adapted to receive a plurality of the subframes, a disk reader, the disk reader being adapted to read one of the disks when the disk is in a disk-reading position, a main frame adapted to receive a single one of the subframes, the mainframe being movably carried by the chassis for movement between a first position, whereat a disk carried therein is in the disk-reading position, and a second position whereat access is provided to a subframe received therein such that a disk may be inserted therein or removed therefrom, disk conveying means for transporting a selected one of the subframes from the magazine to the main frame when the main frame is in the first position, and means operative when the main frame is in the first position for separating the main frame and a subframe received therein from a disk received therein, whereby the disk may be read by the disk reader.

According to a still further feature of the invention, there is provided a disk storage and playback device comprising: a chassis, an n quantity of subframes, each of the subframes being adapted to receive a single disk, a magazine, nondetachable, carried by the chassis, the magazine being adapted to receive n quantity of the subframes, n−1 of the subframes being received in the magazine when one of the subframes is received in the mainframe, a disk reader, the disk reader being adapted to read one of the disks when the disks when the disk is in a disk-reading position, a main frame adapted to receive a single one of the subframes, the mainframe being movably carried by the chassis for movement between a first position, whereat a disk carried therein is in the disk-reading position, and a second position whereat access is provided to a subframe received therein such that a disk may be inserted therein, and disk conveying means for transporting a selected one of the subframes from the magazine to the main frame when the main frame is in the first position.

The above and other objects, features and advantages of the present invention will become apparent from the following description read in conjunction with the accompanying drawings, in which like reference numerals designate the same elements.

BRIEF DESCRIPTION OF THE DRAWINGS

FIG. 4b is a side elevation of the mechanism of FIG. 4a.

FIG. 4c is an end view of the mechanism of FIG. 4a.

FIG. 5c is a side elevation of the subtray limiting means of FIG. 5a.

DETAILED DESCRIPTION OF THE PREFERRED EMBODIMENT

Figure 1:
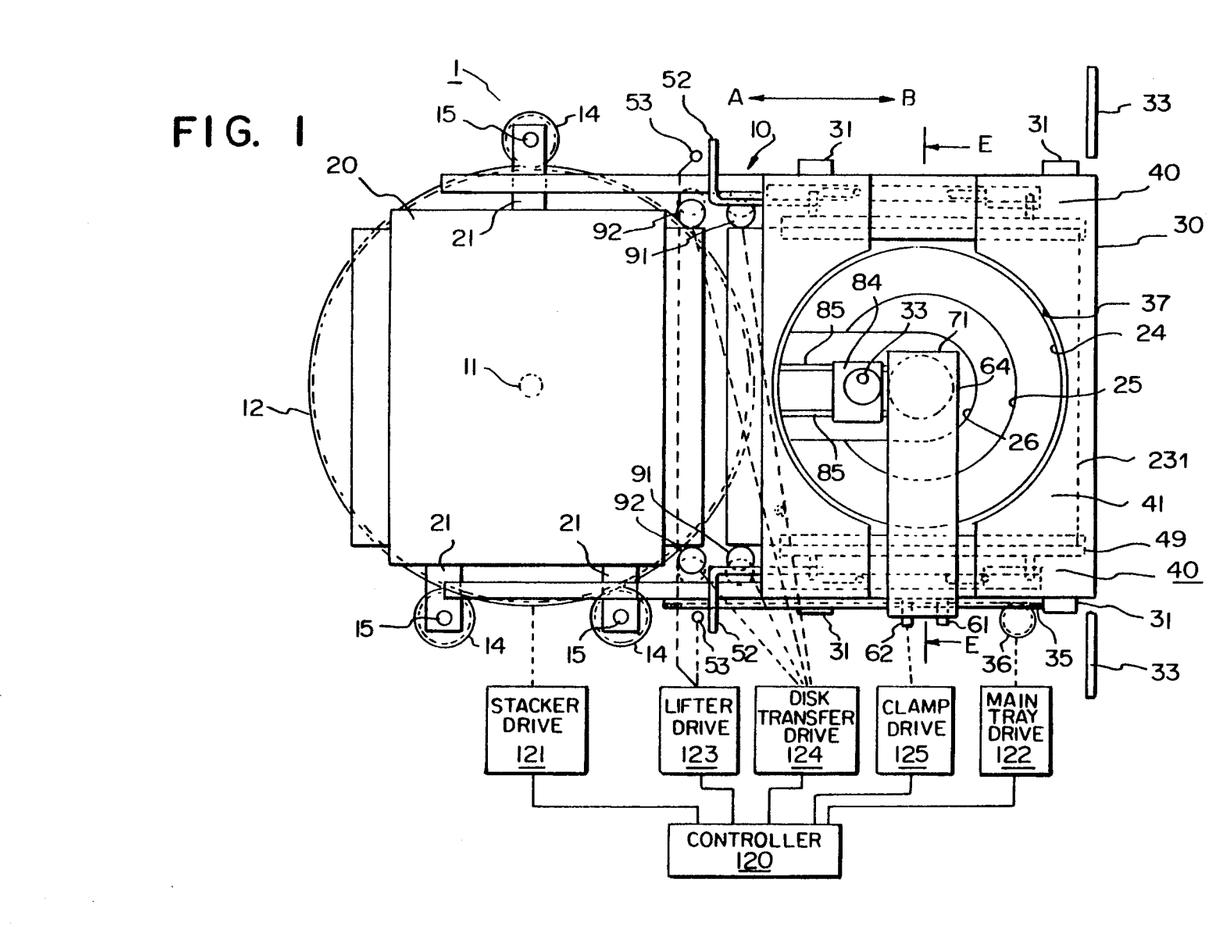
FIG. 1 is a plan view of a disk playback device according to an embodiment of the invention.
Figure 2:
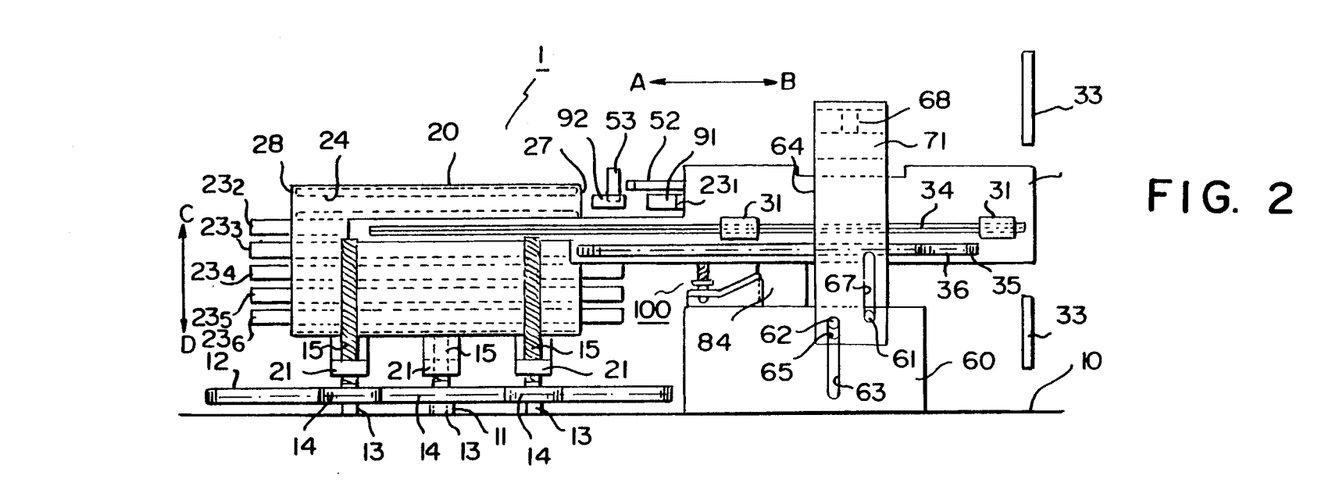
FIG. 2 is a side elevation of the disk playback device of FIG. 1.

Referring to FIGS. 1 and 2, a power gear 12 is rotatably supported on a chassis 10 of a disk playback device 1, by a shaft 11 and is driven clockwise or counterclockwise by a drive unit 121 under control of controller 120. Three drive gears 14 disposed around the periphery of power gear 12 are rotatably supported on chassis 10 by shafts 13 FIG. 2) and are rotated by power gear 12. A first end of each of three lead screws 15 is axially attached to a respective one of drive gears 14 and, therefore, rotates with its drive gear 14. A second end of each lead screw 15 is threaded into a lower threaded portion of a respective one of three legs 21. The upper portions of legs 21 support a stacker 20. Legs 21, with mounted stacker 20, are raised and lowered by the rotation of lead screws 15.

A stacking opening 28 on a left hand side of stacker 20, as shown in FIG. 2, allows disk subtrays 23.1-23.6 to be loaded into stacker 20, while stack guides 24 hold subtrays 23.1-23.6 slidably in place. A select opening 27, on the stacker 20 side opposite stacking opening 28, allows a disk subtray selected from among disk subtrays 23.1-23.6 to be moved from stacker 20 to a main tray 30 to receive or play back a disk.

A V-shaped groove 34 runs along each (right and left) side wall of main tray 30. Two tray guides 31 protrude from each side of chassis 10 into V-shaped grooves 34. Tray guides 31 slidably support main tray 30. A rack gear 35 is disposed along the length of a right side wall of main tray 30. A rack drive gear 36 engages rack gear 35. A main tray drive 122 under the control of controller 120 drives rack drive gear 36 to pull main tray 30 along line A-B.

When rack drive gear 36 is driven clockwise, main tray 30 is moved forward through a front panel 33 for operator access. When rack drive gear 36 is driven counterclockwise, main tray 30 is returned to its playback position behind front panel 33.

In addition to the previously mentioned side walls, main tray 30 includes a floor 41 with a U-shaped opening (not indexed) and two top pieces (not indexed) that are separated by a space that runs from side to side across main tray 30 and includes a circular opening 37. The U-shaped opening in floor 41 and a U-shaped opening 26 in subtray 23.1-23.6 allow the movement of main tray 30 and the unobstructed operation of an optical head 84. Circular opening 37 permits loading disks into an empty subtray 23.1-23.6 in main tray 30.

Two opposing lifters 40, each a mirror image of the other, are installed in main tray 30. One lifter 40 is disposed along and adjacent to each side wall. U-channel guide rails 49 of lifter 40 face each other across the main tray and together form a holder into which subtrays 23.1-23.6 are slid for positioning disks 5.1-5.6 for playback.

Figure 3:
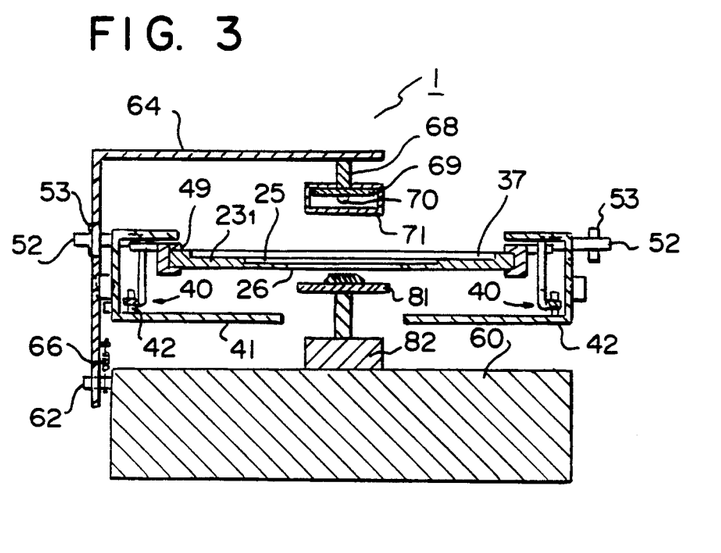
FIG. 3 is a cross section taken along E—E of FIG. 1.
Figure 4A:
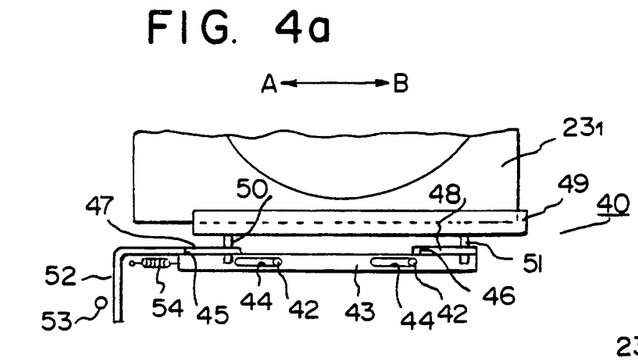
FIG. 4a is a plan view of a guide rail up-down mechanism of the invention.
Figure 4B:
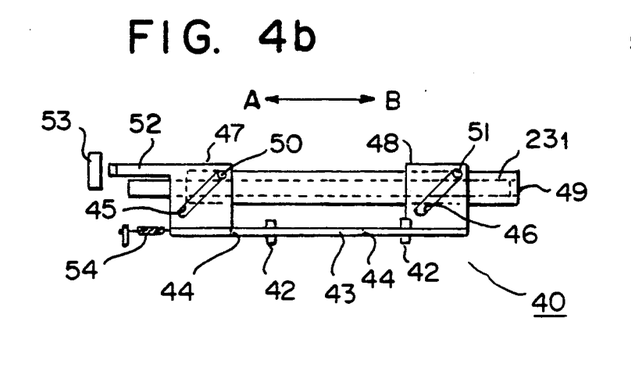
Figure 4C:
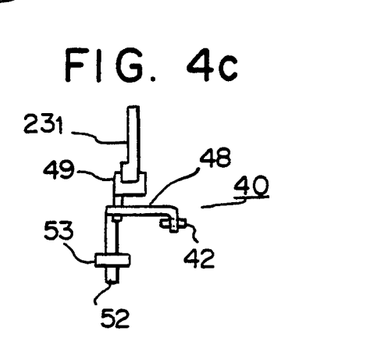

Referring now to FIGS. 4a-4c, each lifter 40 comprises a guide rail 49 that is supported by a rear guide pin 50, sliding in a rear cam slot 45, and a forward guide pin 51 sliding in a forward cam slot 46. Rear cam slot 45 slants upward in a forward direction in a rear bent portion 47. Similarly, forward cam slot 46 slants upward in a forward bent portion 48. Bent portions 47 and 48 are attached to a top side at rear and front ends, respectively, of a sliding plate 43. Sliding plate 43 rests on and is guided by two guide pins 42 that protrude through slots 44 of sliding plate 43 and whose bottom ends are attached to floor 41 as shown in FIG. 3.

A pin (not indexed) secures the first end of a spring 54 (FIGS. 4a and 4b) to floor 41. A second end of spring 54 is attached to the rear of sliding plate 43. Spring 54 maintains constant contact between an L-shaped arm 52 that extends from the rear top of rear bent portion 47 and a drive pin 53.

Referring again to FIG. 1, drive pin 53 is driven along line A-B by a lifter drive 123 under control of controller 120. When lifter drive 123 drives drive pin 53 forward, rear and forward guide pins 50 and 51 move downward in rear and forward cam slots 45 and 46, respectively, lowering guide rail 49. When lifter drive 123 drives drive pin 53 to the rear, the reverse occurs, and guide rail 49 is raised.

Two counter rotating pairs of rollers, first driving rollers 91 and second driving rollers 92, are rotatably installed between stacker 20 and guide rails 49. First driving rollers 91 are adjacent main tray 30 with one driving roller 91 in line with each guide rail 49 in its raised position. Second driving rollers 92 are positioned on opposite sides of and adjacent stacker 20 and aligned with first driving rollers 91. First and second driving rollers 91 and 92 transfer disk subtrays 23.1-23.6 in a virtually straight line between stacker 10 and main tray 30. First drive rollers 91 and second drive rollers 92 are driven in first directions by a disk transfer drive 124 under the control of controller 120 to transfer subtrays 23.1-23.2 from stacker 20 to main tray 30 and in reverse directions to move subtrays 23.1-23.2 from main tray 30 to stacker 20.

During playback, first driving rollers 91 are disengaged from selected disk subtray 23.1-23.6 and moved to retracted positions shown in phantom on FIG. 1 to allow the operation of main tray 30. Second driving rollers 92 are moved to retracted positions shown in phantom to allow up-down motion of stacker 20 for subtray 23.1-23.6 selection.

Referring again to FIG. 2, an optical head base 60 is centered on chassis 10 below main tray 30 in its playback position.

Referring to FIG. 3, a turntable drive motor 82 is centered on optical head base 60 and disposed in an upward direction. An output shaft of turntable drive motor 82 extends upward to rotatably support a turntable 81 to rotate one of disks 5.0 through 5.6 for playback.

Referring now to FIG. 1, a pair of optical head guide rails 85 are disposed behind turntable drive motor 82 and extending toward the rear of optical head base 60. Optical head guide rails 85 support and guide the tracking motion of optical head 84. An objective lens 83 is mounted on and is part of optical head 84.

Referring to FIG. 2, a limiter apparatus 100 is disposed toward the rear of optical head base 60, and to the right of optical head guide rails 85. Limiter apparatus is shown in greater detail in FIGS. 5a-5b, to which reference now is made. Limiter apparatus 100 comprises a limiter cam 105 that is mounted to the top rear of optical head base 60 to the right of optical head guide rails 85. A limiter pin 101 is slidably held in a tray hole 107 by the action of a spring 108 and a pin 104. A first end of pin 104 is attached to a bottom end of limiter pin 101. A second end of pin 104 is attached to a first end of spring 108. A second end of spring 108 is attached to floor 41 to urge limiter pin 101 upward through tray hole 107. A stopper 106 surrounds limiter pin 101 to limit its upward travel. A guide pin 103 attached to the bottom end of limiter pin 101 contacts the cam face of limiter cam 105.

Figure 5A:
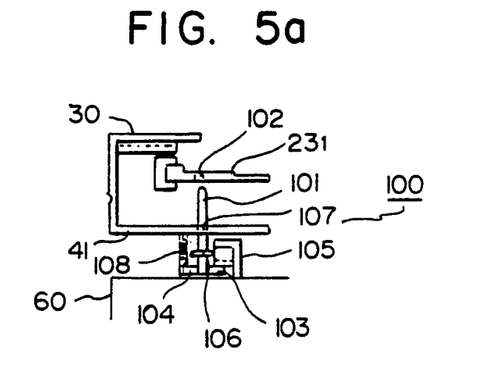
FIG. 5a is a cross section of a subtray limiting means of the invention with the subtray fully raised and the limiting pin in the lowered position.
Figure 5B:
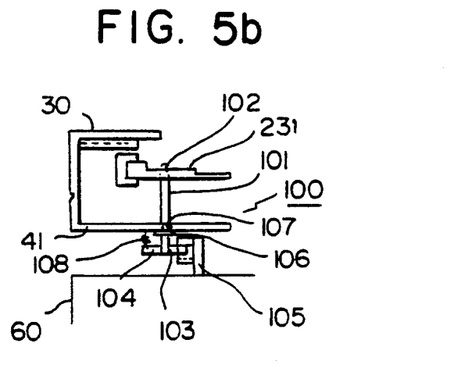
FIG. 5b is a cross section of the subtray limiting means with the subtray fully raised and the limiting pin raised.
Figure 5C:
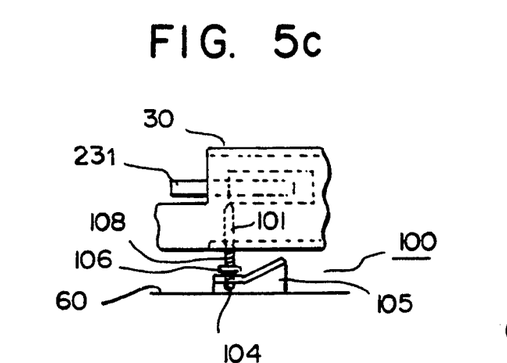

When main tray 30 is pushed back to its play position, guide pin 103 is engaged by limiter cam 105 which pulls it down towards optical head base 60 and holds it in that position. When main tray 30 is pulled forward through front panel 33, guide pin 103 disengages from limiter cam 105 and limiter pin extends up through tray hole 107 to engage a limiter hole 102 in subtray 23.1 to ensure correct alignment of subtray 23.1.

Referring to FIGS. 1, 2 and 3, a bottom end of a first leg of an L-shaped clamp arm 64 is movably attached to a right side of optical head base 60 by a fixed pin 61, and a movable pin 62 that extend from the right side of optical head base 60 through slots 67 and 65 respectively. Fixed pin 61 is fixed in position on optical base 60, while movable pin 62 is slidably mounted through a slot 63 in optical head base 60. A clamp drive 125 is energized controller 120 to drive movable pin 62 up and down to position L-shaped clamp arm 64 as required during operation. A first end of a spring 66 is connected to movable pin 62, while a second end of spring 66 is connected to clamp arm 64 by a pin (not indexed) to hold movable pin 62 against the top of slot 65. The small amount of free travel for L-shaped clamp arm 64 provided by slot 65 and spring 66 reduce impact shock as L-shaped clamp arm 64 is lowered.

A shaft 68 is suspended from a free end of a second leg of L-shaped clamp arm 64. A second end of shaft 68 is attached to a disk 69 by a semi-spherical projection 70. A cylindrical clamp 71 loosely surrounds disk 69 and projection 70 so that when a disk 5.1 is on turntable 81 for playback, clamp arm 64 is lowered and cylindrical clamp 71 is pressed down on disk 5.1 by projection 70 to clamp disk 5.1 in place.

Referring again to FIG. 1, it can be seen that subtrays 23.1-23.6 are rectangular trays having a U-shaped opening through which turntable 81 and the output shaft of turntable drive motor 82 motor can extend, and through which optical head 84 has an unobstructed line of sight to disk 5.1 during playback. Circular opening 37 is sized to hold standard sized disks. A concentric recess 25 is centered in circular opening 37 is sized to hold smaller disks.

Figure 6:
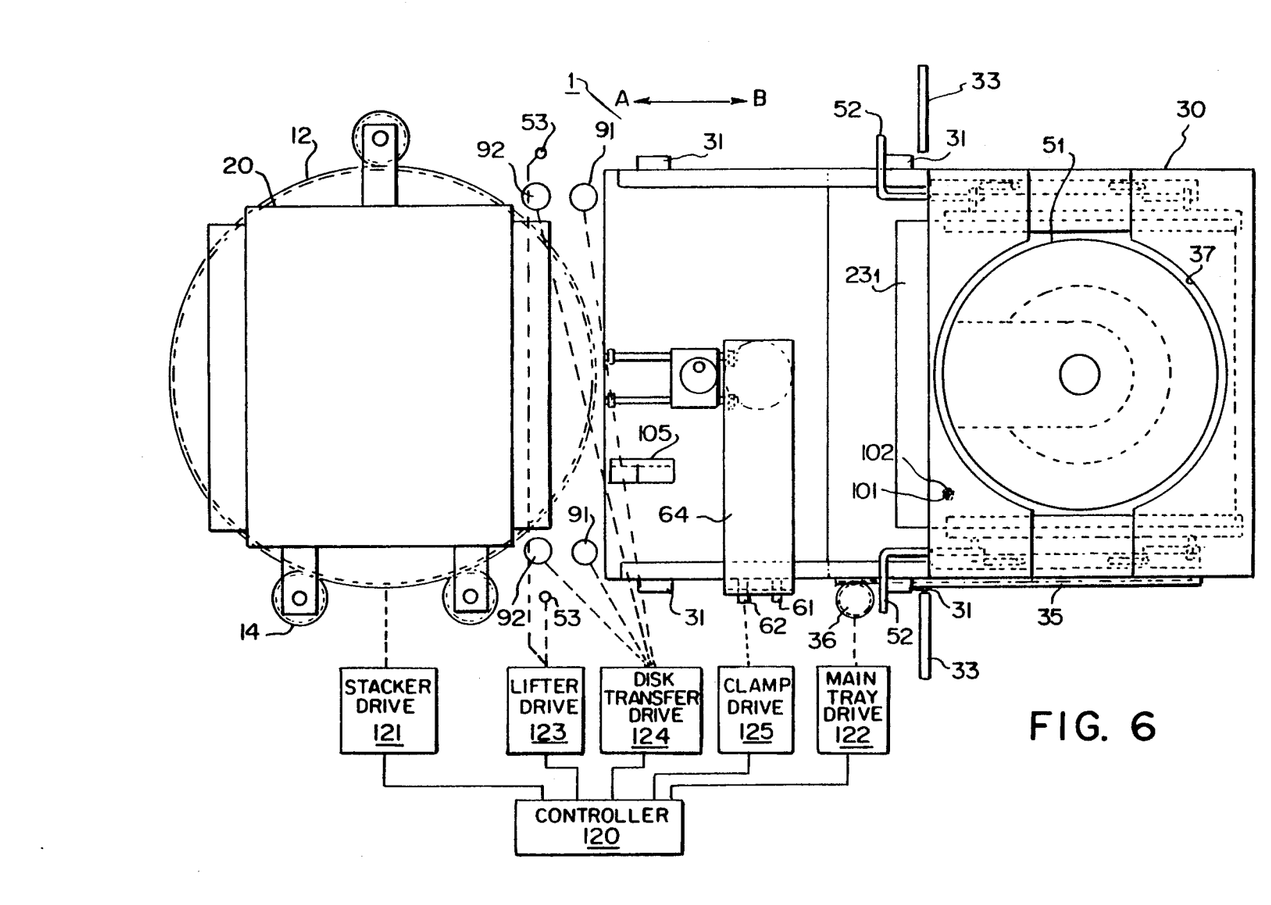
FIG. 6 is a plan view of the invention of FIG. 1 with the main tray pulled out.
Figure 7:
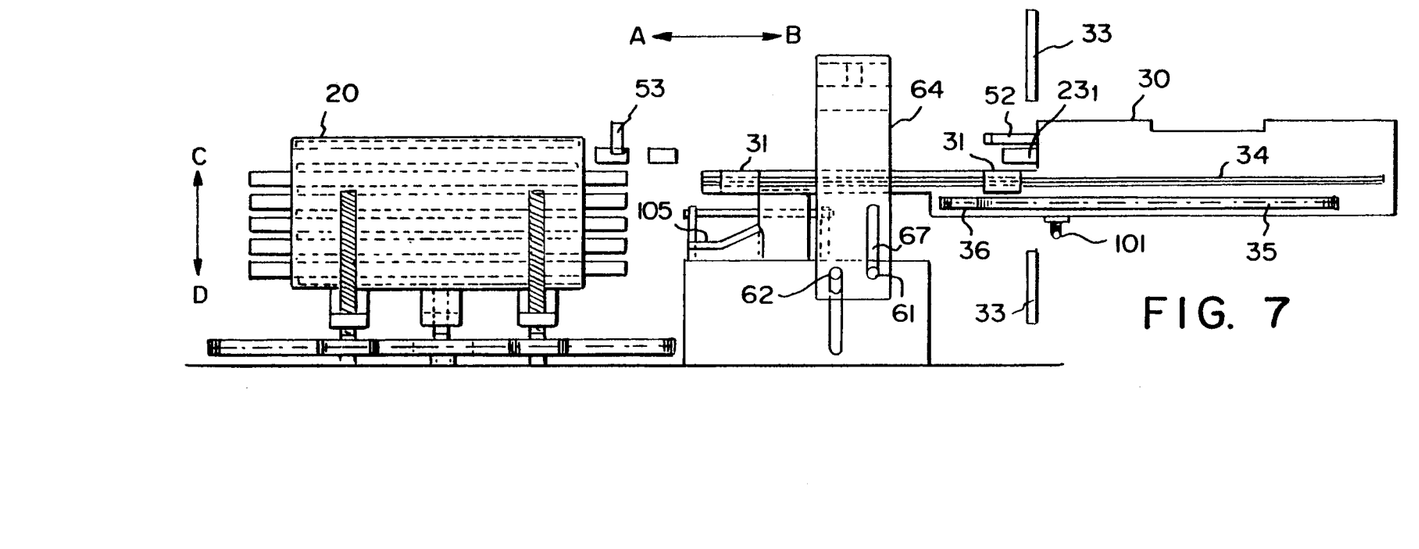
FIG. 7 is a side elevation of the invention of FIG. 6.
Figure 8:
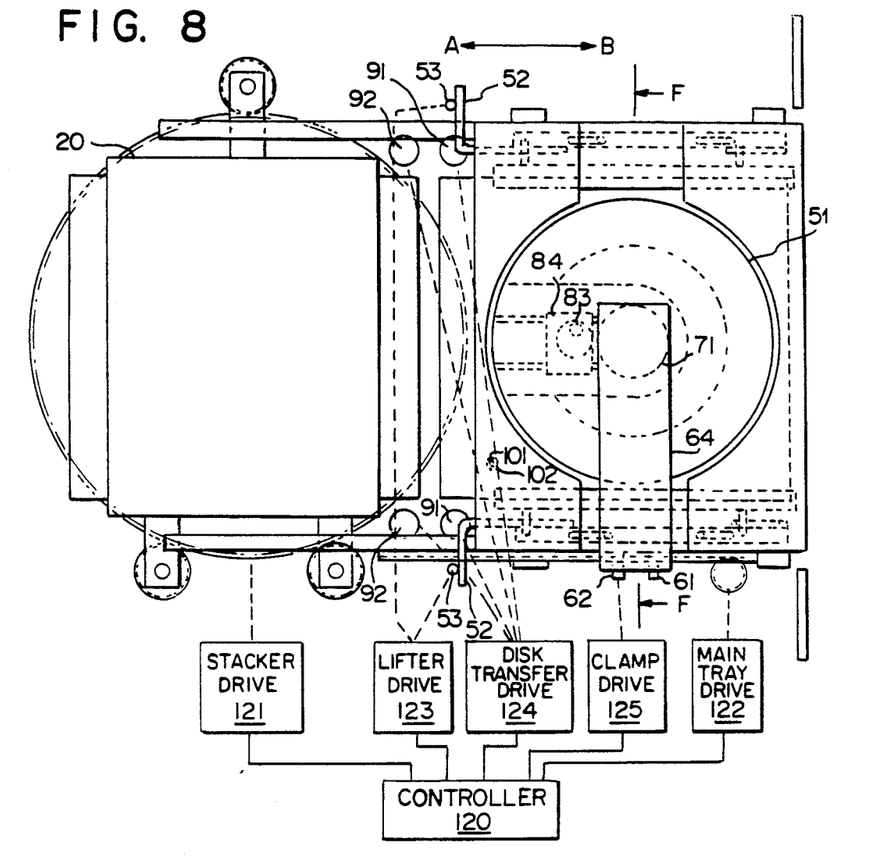
FIG. 8 is a plan view of the invention with a disk installed in the main tray.

Referring to FIGS. 6 and 7, when a single disk 5.1 is to be played, main tray 30 is moved by rack drive gear 36 to the extended position shown outside front panel 33. Subtray 23.1 is positioned in main tray 30. Limiter pin 101 is raised through limiter hole 102 of subtray 23.1 to hold subtray 21 accurately in its operating position in main tray 30.

The operator inserts a disk 5.1, with its recorded surface facing down, into subtray 23.1 and initiates an operate control. Controller 120 initiates the operation of main tray drive 122, which drives rack drive gear 36 counterclockwise to move rack gear 35 and main tray 33 back to the play position on V-shaped grooves 34 and tray guides 31. As main tray 33 moves back, limiter pin 101 is engaged by limiter cam 105 to disengage limiter pin 101 from limiter hole 102 in subtray 23.1.

Figure 9:
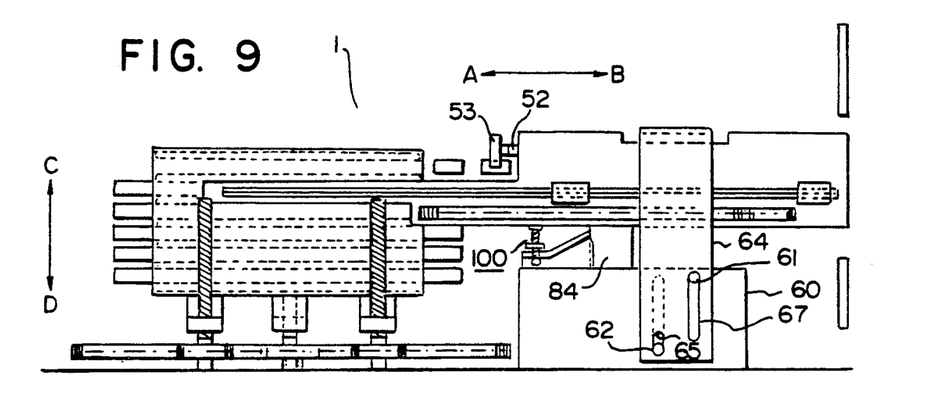
FIG. 9 is a side elevation similar to FIG. 6 with a disk installed in the main tray.

When main tray 30 is fully positioned in the play position, main tray drive 122 stops rack drive gear 36. Controller 120 causes clamp drive 125 to move movable pin 62 down, thereby lowering clamp arm 64 with shaft 68, disk 69, projection 70 and cylindrical clamp 71 down over disk 5.1 until, when the limit of motion is reached, fixed pin 61 at the top of slot 67, as shown in FIG. 9.

Figure 10:
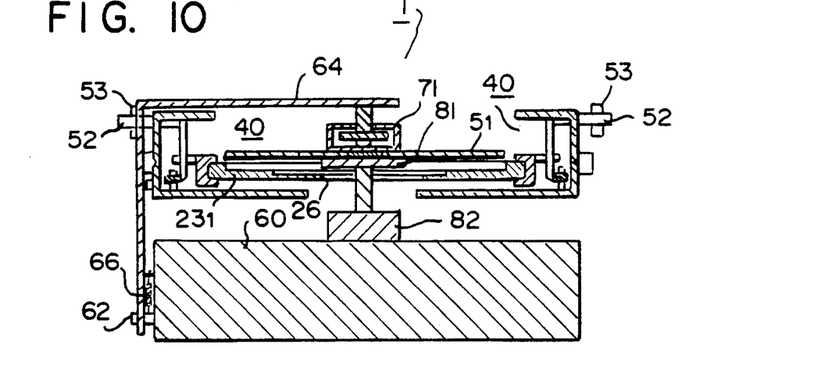
FIG. 10 is a cross section of the invention with a disk installed in the main tray, taken along line F—F of FIG. 8.

Controller 120 causes lifter drive 123 to move drive pin 53 forward lowering lifter 40. As shown in FIG. 10, when lifter 40 is in the fully down position, subtray 23.1 is below the level of turntable 81, and disk 5.1 is clamped between turntable 81 and cylindrical clamp 71.

Figure 5D:
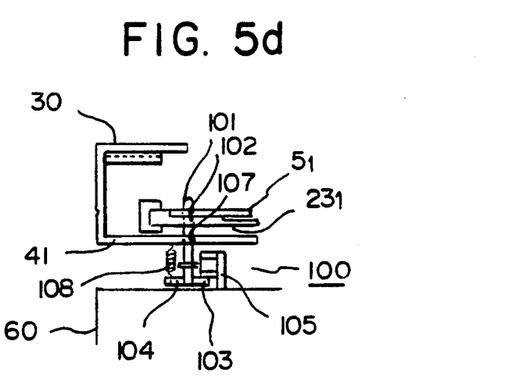
FIG. 5d is a view of the subtray limiting means with the subtray and limiting pin lowered.

Referring to FIG. 5d, when lifter 40 is fully lowered, limiter pin 101 is inserted in limiter hole 102 to maintain the alignment of subtray 23.1 with main tray 30.

At this time, turntable drive motor 82 rotates turntable 81 and disk 5.1. Optical head 84, shown in FIG. 1, is energized to read disk 5.1. As it reads disk 5.1 optical head 84 is moved along optical head guide rails 85.

When playback of disk 5.1 is complete, optical head 84 is turned off and the rotation of turntable 81 is stopped.

Controller 120 now causes clamp drive 125 to raise clamp arm 64 with shaft 68, disk 69, projection 70, and cylindrical clamp 71 to its start position. At the same time, controller 120 moves drive pin 53 back from lifter 40, allowing spring 54, shown on FIG. 4, to pull lifter 40 back, raising guide rails 49 to their start position causing subtray 23.1 to lift disk 5.1 off turntable 81.

When an operator operates an appropriate control, controller 120 causes main tray drive 122 to drive rack drive gear 36 clockwise to move main tray 30 forward through front panel 33 to return the disk playback device to its start condition shown in FIGS. 6 and 7.

Referring to FIGS. 1 and 2, when a disk 5.1–5.6 is to be selected from stacker 20, and disk playback device 1 is in the condition shown in FIG. 1, when the operator initiates the proper controls, and selects for example disk 5.2 in subtray 23.2 for playback, first drive rollers 91 and second drive rollers 92 are moved inward to engage subtray 23.1 that is in main tray 30. Controller 120 causes disk transfer drive 124 to rotate in the direction necessary to move tray 23.1 into its position in stacker 20. Engaged by first drive rollers 91, subtray 23.1 is drawn out of guide rails 49 and moved along by second drive rollers 92 until it is in place on guide rails 24 in stacker 20. At this time, second drive rollers 92 are retracted into their disengaged positions, shown in phantom in FIG. 1.

With second drive rollers 92 retracted, controller 120 causes drive unit 121 to rotate power gear 12 and drive gears 14 with lead screws 15 in the direction necessary to raise stacker 20 to align subtray 23.2 with guide rails 49 of main tray 30. Disk transfer drive 124 now moves second drive rollers 92 into the engaged position, shown as solid in FIG. 1. With subtray 23.2 engaged by second drive rollers 92, disk transfer drive 124, under the control of controller 120, rotates first and second drive rollers 91 and 92 in the direction necessary to transfer subtray 23.2 to guide rails 49 along a virtually straight path. When the transfer is complete, first drive rollers 91 are disengaged from subtray 23.2 and moved back to the disengaged position, shown in phantom in FIG. 1.

Controller 120 now causes clamp drive 125 to move movable pin 62 down, thus lowering clamp arm 64, with shaft 68, disk 69, projection 70 and cylindrical clamp 71, down over disk 5.2 until the limit of motion is reached with fixed pin 61 at the top of slot 67, as shown in FIG. 9. At the same time, controller 120 causes lifter drive 123 to move drive pin 53 forward, thus lowering lifter 40 as in the previously given description.

As shown in FIG. 10, when lifter 40 is in the fully down position, subtray 23.2 is below the level of turntable 81, and disk 5.2 is clamped between turntable 81 and cylindrical clamp 71.

Referring to FIG. 5d, when lifter 40 is fully lowered, limiter pin 101 is inserted in limiter hole 102 to maintain the alignment of subtray 23.2 with main tray 30.

At this time, turntable drive motor 82 rotates turntable 81 and disk 5.2. Optical head 84, shown in FIG. 1, is energized to read disk 5.2 and moved along optical head guide rails as it reads disk 5.2.

When playback of disk 5.2 is complete, optical head 84 is turned off and the rotation of turntable 81 is stopped.

Controller 120 now causes clamp drive 125 to raise clamp arm 64 with shaft 68, disk 69, projection 70, and cylindrical clamp 71 to its start position. At the same time, controller 120 causes drive pin 53 to move back from lifter 40, allowing spring 54, shown on FIG. 4, to pull lifter 40 back, raising guide rails 49 to their start position causing subtray 23.2 to lift disk 5.2 off turntable 81.

Disk playback device 1 can now be operated to play another disk. If an automatic play mode is selected, the subtray select, transfer and playback cycle is repeated until all, or selected ones, of the disks 5.1–5.6 stored in stacker 20 are played back.

Referring to FIGS. 6 and 7, when a disk, for example disk 5.1, is to be loaded into stacker 20 without being played back, the disk playback device is in the condition shown in FIG. 6 with main tray 30 extended through front panel 33. Subtray 23.1 is held in alignment with main tray 30 by the entry of limiter pin 101 in limiter hole 102 of subtray 23.1.

The operator positions disk 5.1, recorded surface down, in subtray 23.1. The operator operates a load control (not shown) to position subtray 23.1, carrying disk 5.1, into position 1 of stacker 20. Main tray drive 122, under the control of controller 120, rotates rack drive gear 36 counterclockwise to move rack gear 35 and main tray 30 into disk playback device 1 where subtray 23.1 is engaged by first drive rollers 91. As main tray 30 is moved back, limiter cam 105 engages limiter pin 101 and pulls it down out of limiter hole 102, thus freeing subtray 23.1 in main tray 30.

When main tray 30 is aligned with the selected tray storage space, in this example, space 1, second drive rollers 92 are positioned in their operating position, and controller 120 causes disk transfer drive 124 to rotate first and second drive rollers to transfer subtray 23.1, with disk 5.1 therein, into space of stacker 20.

To load more disks into subtrays 23.2–23.6 and stacker 20, the operator selects the next position of stacker 20 to be loaded and initiates the operation. Second drive rollers 92 are retracted to the disengaged position, allowing stacker 20 to be moved up or down freely by the action of drive unit 121, power gear 12, drive gears 14 and lead screws 15 under the direction of controller 120 to align the selected position and subtray 23.2–23.6, for example 23.2, with guide rails 49 of main tray 30. Second drive rollers 92 are then returned to their operating position to engage subtray 23.2.

Controller 120 now causes disk transfer drive 124 to drive first and second drive rollers 91 and 92 in the reverse direction to transfer subtray 23.2 to guide rails 49 of main tray 30.

With subtray 23.2 positioned in main tray 30, controller 120 causes main tray drive 122 to rotate rack drive gear 36 clockwise to move rack gear 35 and main tray 30 forward through front panel 33. As main tray 30 is moved forward, limiter pin 101 is released by limiter cam 105, and moves up through limiter hole 102 in subtray 23.2 to maintain proper alignment. The operator can now place disk 5.2 in subtray 23.2 and continue the operation until stacker 20 is fully loaded.

Having described preferred embodiments of the invention with reference to the accompanying drawings, it is to be understood that the invention is not limited to those precise embodiments, and that various changes and modifications may be affected therein by one skilled in the art without departing from the scope and spirit of the invention as defined in the appended claims.

What is claimed is:

1. A disk storage and playback device comprising:
   a chassis;
   a magazine nondetachably carried by said chassis, said magazine including means for receiving a plurality of substantially planar disks in a concentric array;
   a disk reader for reading one of said disks when said one of said disks is in a disk-reading position;
   first disk conveying means for transporting a selected one of said disks from said magazine to said disk-reading position along a first straight line path in a plane of said disk;

second disk conveying means for transporting a disk not stored in said magazine in a second straight line path beginning outside said disk storage and playback device to said disk-reading position within said disk storage and playback device; and means for displacing said magazine to bring a selected one of said disks into said plane.

2. A disk storage and playback device comprising:

a chassis;

a magazine nondetachably carried by said chassis, said magazine including means for receiving a plurality of substantially planar disks in a concentric array;

a disk reader for reading one of said disks when said one of said disks is in a disk-reading position;

first disk conveying means for transporting a selected one of said disks from said magazine to said disk-reading position along a straight line path in a plane of said disk;

second disk conveying means for transporting a disk not stored in said magazine to said disk-reading position;

means for displacing said magazine to bring a selected one of said disks into said plane;

a plurality of subframes, each of said subframes including means for receiving a single one of said disks;

said magazine including means for receiving a plurality of said subframes; and a main frame for receiving a single one of said subframes;

said main frame being movably carried by said chassis for movement between a first position, whereat a disk carried therein is in said disk-reading position, and a second position whereat access is provided to a subframe received therein such that a disk may be one of inserted therein and removed therefrom.

3. A disk storage and playback device according to claim 2, wherein said first disk conveying means comprises means for removing a selected one of said subframes from said magazine and for inserting the same into said mainframe.

4. The disk storage and playback device of claim 1, wherein said second disk conveying means includes means for transporting disks in said plane, along said second straight line path which is an extension of said first straight line path of said first disk conveying means.

5. A disk storage and playback device comprising:

a chassis;

a plurality of subframes, each of said subframes being adapted to receive a single one of said disks;

a magazine, nondetachably, carried by said chassis, said magazine being adapted to receive a plurality of said subframes;

a disk reader adapted to read one of said disks when said disk is in a disk-reading position;

a main frame adapted to receive a single one of said subframes;

said mainframe being movably carried by said chassis for movement between a first position, whereat a disk carried therein is in said disk-reading position, and a second position whereat access is provided to a subframe received therein such that a disk may be inserted therein or removed therefrom;

disk conveying means for transporting a selected one of said subframes from said magazine to said main frame when said main frame is in said first position; and means operative when said main frame is in said first position for separating said main frame and a subframe received therein from a disk received therein, whereby said disk may be read by said disk reader.

6. The disk storage and playback device of claim 5, wherein said separating means comprises means for supporting said disk in said disk-reading position and means for displacing said main frame and said subframe received therein to a position nonobstructive to said disk reader.

7. A disk storage and playback device comprising:

a chassis;

an n quantity of subframes, each of said subframes being adapted to receive a single disk;

a magazine, nondetachable, carried by said chassis, said magazine being adapted to receive n quantity of said subframes;

n−1 of said subframes being received in said magazine when one of a subframes is received in said mainframe;

a disk reader adapted to read one of said disks when said disk is in a disk-reading position;

said mainframe being adapted to receive a single one of said subframes, said mainframe being movably carried by said chassis for movement between a first position, whereat a disk carried therein is in said disk-reading position, and a second position whereat access is provided to a subframe received therein such that a disk may be inserted therein;

and disk conveying means for transporting a selected one of said subframes from said magazine to said main frame when said main frame is in said first position.

8. A disk storage and playback device comprising:

a chassis:

a magazine nondetachably carried by said chassis;

said magazine including a plurality of disk storage locations therein;

a disk reader;

means for displacing said magazine to align a desired one of said disk storage locations at a desired level;

first disk transport means for moving a disk in said desired one of said disk storage locations in a substantially straight line from said magazine to said disk reader;

said first disk transport means being further effective for moving said disk from said disk reader back to its respective disk storage location;

second disk transport means for moving a disk in a substantially straight line from outside said disk storage and playback device to said disk reader; and means, effective without requiring reading of said disk, for moving said disk from said second disk transport means to said first disk transport means, whereby said first disk transport means is enabled to deposit said disk, originating outside said device, in an empty one of said disk storage locations, thereby permitting stocking said magazine with disks.

9. Apparatus according to claim 8, further comprising:

means effective without requiring reading of said disk, for moving said disk from said first transport means to said second transport means; and means for permitting said second transport means to move said disk to a location outside the device, whereby disks stocked in said magazine may be removed from the device.

* * * * *

UNITED STATES PATENT AND TRADEMARK OFFICE
CERTIFICATE OF CORRECTION

PATENT NO. : 5,123,001
DATED : June 16, 1992
INVENTOR(S) : Niro Nakamichi, et al It is certified that error appears in the above-indentified patent and that said Letters Patent is hereby corrected as shown below:

On the Title page, below item [22], please add Foreign Application Priority Data as follows:

-- [30]  Foreign Application Priority Data

Aug. 26, 1989 [JP]  Japan 1-219071
        Aug. 26, 1989 [JP]  Japan 1-219072
        Aug. 26, 1989 [JP]  Japan 1-219073

In column 10, line 19, "a subframes is received in said mainframe;" should read --said subframes is received in a mainframe;--.

Signed and Sealed this

Twelfth Day of October, 1993

Attest:

BRUCE LEHMAN

Attesting Officer     Commissioner of Patents and Trademarks